March 6, 1962  E. C. KRUEGER  3,024,073
BEARING STRUCTURE AND SUPPORT FOR RECIPROCABLE MEMBER
Filed Aug. 24, 1959
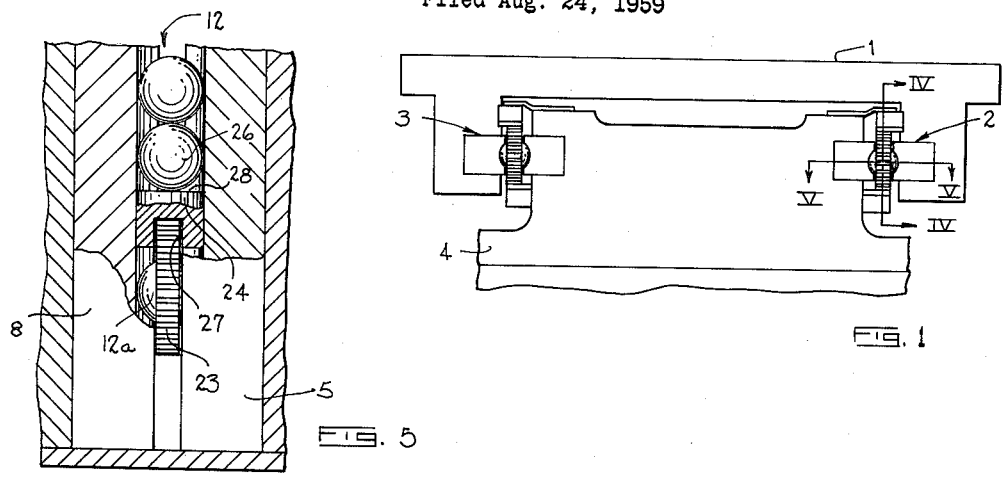
FIG. 5
FIG. 1
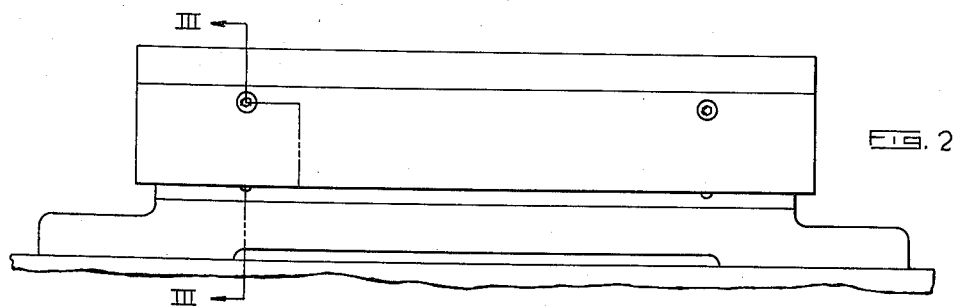
FIG. 2
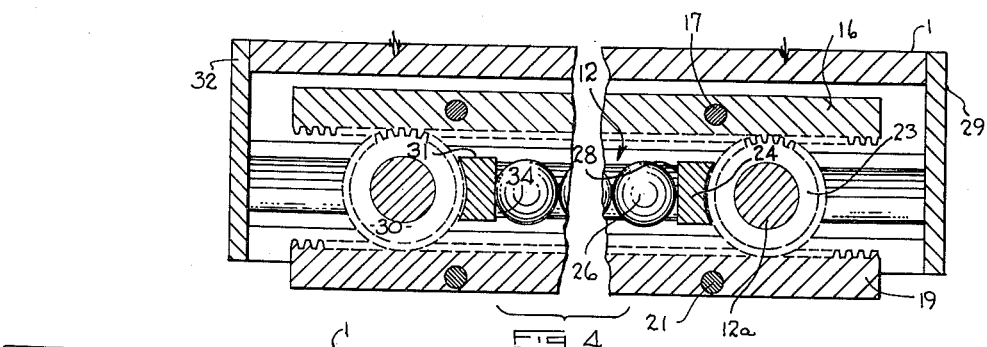
FIG. 4
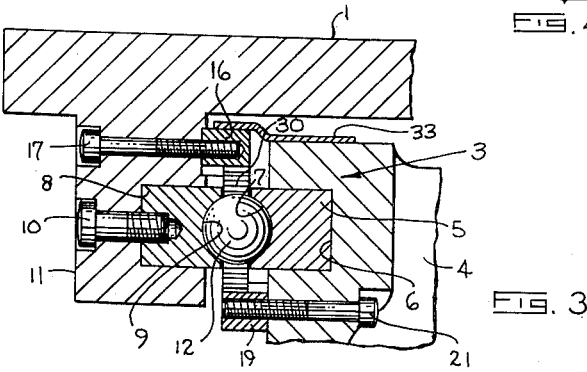
FIG. 3
*INVENTOR.*
EDWARD C. KRUEGER
BY
Woodhams Blanchard & Flynn
ATTORNEYS United States Patent Office 3,024,073
Patented Mar. 6, 1962

3,024,073
BEARING STRUCTURE AND SUPPORT FOR
RECIPROCABLE MEMBER
Edward C. Krueger, Otsego, Mich., assignor to Hammond
Machinery Builders, Inc., Kalamazoo, Mich. a corporation of Michigan
Filed Aug. 24, 1959, Ser. No. 835,759
10 Claims. (Cl. 308—6)

This invention relates to a low-friction support for a reciprocable table such as a work-feeding table of the type commonly used in machine tools.

While the apparatus of the invention is widely applicable to a variety of specific uses, the need out of which the herein disclosed invention arose, and its present principal use, relates to machine tools and accordingly the hereinafter appearing discussion will be set forth in connection with such need and use. However, it will be clearly understood that such reference is for illustrative purposes only and is not limiting.

It has been the practice for upwards of twenty years, and perhaps longer, to utilize ball-bearing containing ways for supporting the feeding table of a machine tool, such as a grinder or a power saw. These ways are normally constructed from two pairs of rails, each having a sidewardly, horizontally opening, semicircular groove, the grooves in a given pair of rails being arranged to face each other. A plurality of bearing balls are introduced into said grooves and provide for easy reciprocal movement of the table supported thereby with respect to a supporting base. This type of reciprocable support has been highly satisfactory in that it provides extremely easy movement of the table with respect to its base while at the same time providing a solid support for the table and relative freedom from inaccuracies resulting from normal wear.

However, one problem has continuously existed in connection with this type of reciprocable table support and has not previously, insofar as I am aware, been satisfactorily overcome. Since it is not possible, or at least it is not economically feasible, to provide a groove in a given rail of such precision and shape as to fit exactly the contour of the several bearing balls, it becomes necessary to grind said grooves on a radius slightly larger than the radius of said bearing balls, although the actual amount by which the radius of the groove exceeds the radius of the balls is of the order of only a few thousandths of an inch. Thus, as detailed further hereinafter, the ball actually contacts a given rail through only a relatively small portion of its circumference, rather than through the entirety of that portion of its circumference which is generally within the groove of a given rail. However, because the balls and rails are usually made within tolerances of a few- ten-thousandths of an inch, it is inevitable that small variations will appear in the size, shape and relative positioning of the resulting parts. For example, these variations may appear, among other places, as variations in the shape of the balls, in the shape of the rails, in the concentricity of the balls, in the centering of the grooves in the rails and in the alignment of the rails with respect to each other on their mountings. Further, variations in loading applied to the structure will produce small but significant variations in the relative positioning of the parts. Thus, it is inevitable that the zone of contact between the balls and the rails will vary somewhat from ball to ball at a given moment and will also vary for the same ball from one place to another along the rails.

Consequently, and having in mind the embodiment wherein the ball rotates around a horizontal axis, the center of the contact zone between a given ball and a given rail will change along the surface of the ball so as to cause said center of contact to describe circles of varying radii about said axis of rotation. Otherwise stated, the point of contact between the ball and a given rail will define along each rail a somewhat wavy line with respect to a theoretically perfect horizontal contact line. This means that the relative movement between a given ball and a given rail will vary as said ball rotates a given number of times with respect to said rail and, further, it means that the rate of relative movement between one ball and an associated rail may be different than the rate of relative movement of an adjacent ball with respect to said rail. This erratic rolling of the balls with respect to the rails results eventually in the balls accumulating and jamming at one end or the other end of the respective rails, although, as a particular example, such "accumulation" may represent a total movement out of the correct position of a given ball of the order of not over $\frac{1}{32}$ of an inch. Nevertheless, in such a jammed position the balls can no longer roll freely and will instead slide. Thus, a secondary, or wear, groove is created by the balls in the surface of the guiding grooves in the supporting rails. Inasmuch as the rails and the balls are adjusted for a solid metal-to-metal contact between the rails and the balls, and further, inasmuch as the machines in question must hold the work within a very high degree of accuracy, it has been found that when the rails and balls slide or score with respect to each other, as above described, the ball forms a groove or gouge in the surface of the groove normally receiving the ball and the precision of the machine is lost.

In a practical operation of tables wherein the table is moved by hand, this is not particularly serious inasmuch as the operator can feel the difference in the action of the table when the balls become arranged in this manner and can take relatively simple corrective measures. However, where the table is driven by power, no such "feel" is available and the balls often quickly jam and are thereby caused to slide and gouge. Thus, the gouging of the rail proceeds very quickly and an expensive rail made of the hardest steel available and representing many hours of labor time in the manufacture thereof can be ruined in a matter of minutes or even seconds.

Accordingly, the objects of the invention are:

(1) To provide ball-controlling means within ball-separated rails, or ways, by which the working of a set of balls toward the end of the ways and the binding of the balls therein will be positively prevented.

(2) To provide ball-controlling means, as aforesaid, which will not to any appreciable degree interfere with the smooth and easy operation of conventional ballways.

(3) To provide ball-controlling means, as aforesaid, which can be utilized without materially changing the design of ballways as now being made.

(4) To provide ball-controlling apparatus, as aforesaid, which will not add appreciably to the overall cost of machines wherein same is utilized in ballways and which, further, will not add appreciably to the maintenance cost of such machine.

(5) To provide means by which the balls of a conventional ballway are positively held in a predetermined position with respect to each other and are all positively caused to move at the same speed with respect to each other and with respect to adjacent rails whenever one rail moves with respect to the other rail, and will do so regardless of the irregularities above mentioned as inevitably causing differences in the rate of movement of said balls with respect to each other and with respect to a given rail.

Other objects and purposes of the invention will become apparent to persons acquainted with apparatus of the general type upon reading the following disclosure and inspection of the accompanying drawings.

In the drawings:

FIGURE 1 represents an end view of a reciprocable table mounted on ballways and utilizing the apparatus of the invention.

FIGURE 2 represents a side view of the apparatus shown in FIGURE 1.

FIGURE 3 represents a fragmentary sectional view taken on the line III—III of FIGURE 2.

FIGURE 4 represents a broken sectional view taken on the line IV—IV of FIGURE 1.

FIGURE 5 represents a fragmentary sectional view taken on the line V—V of FIGURE 1.

In describing the invention certain terminology will be utilized for convenience in reference and it will be understood that such terminology is utilized for convenience only and is not limiting. For example, the terms "upward" and "downward" and derivatives thereof and words of similar import will refer to directions with respect to the apparatus in its normal position of use, said position being the same as the positions shown in FIGURES 1 and 2 of the drawings. Similarly, the terms "rightward" and "leftward" and derivatives thereof and words of similar import will refer to directions taken in connection with the drawings, and particularly the figure of the drawings in connection with which such terminology is used in a given instance. The terms "inward" and "outward" and derivatives thereof and words of similar import will be used to designate directions toward and away from the geometric center of the device in connection with which such terminology is used.

Other terminology of generally similar character will be employed as convenient and will be understood throughout as being for reference purposes only.

*In General*

In general the invention consists of providing means for effecting positive and uniform movement of said balls with respect to and in response to relative longitudinal movement of the ways within and between which said balls are held. In a particular embodiment here used to illustrate the invention, the means accomplishing this movement of the balls includes a pair of toothed racks respectively placed on opposite sides of the balls of a given ballway, one rack being placed on the underside of the table and the other rack being placed on an upwardly facing surface of the base. A gear is placed in mesh with both of said racks at one end of a row of balls and a similar gear is placed at the other end of a row of balls. Buffer or limit means may, if desired, be placed between the respective gears and the ball adjacent to each of said gears respectively. Thus, said balls are caused to move positively with respect to both the table and the supporting means, and the irregularities in movement of the balls above mentioned are not permitted to accumulate to a point sufficient to cause the binding and resulting sliding above referred to.

*Detailed Description*

Referring now to the drawings, there is shown a reciprocable table 1 supported by a pair of ballways 2 and 3 upon a base 4. Since each of the ballways is identical with the other, a sufficient description will be provided by reference to only one of said pair of ballways, the other being shown herein only for completeness of illustration.

The rightward (FIGURE 3) rail 5 of the ballway 3 is in this embodiment of substantially rectangular external cross section and is received in an elongated groove 6 arranged in said base structure 4. Said rail has a sidewardly (here leftwardly) opening groove 7 for the reception of said balls. Said groove is of uniform cross section throughout the length of the rail and is of radius slightly larger than the radius of the balls hereinafter mentioned which are to be placed within the groove. The order of such differences in radii is, however, very small. In the case of balls of one-half inch in diameter the radius of the groove will normally be only approximately a few thousandths of an inch larger.

A similar rail having a groove 9 is arranged parallel to the rail 5 and is fastened in any convenient manner onto the table 1. In this embodiment, said rail 8 is fastened in any convenient manner, such as by a plurality of screws of which one appears at 10, onto a depending member 11 extending downwardly from the table 1. The screws by which the rails are supported respectively onto the base structure and the table are adjustable for positioning said rails precisely parallel with respect to each other in a manner already practiced in the industry.

The balls 12 are arranged within said grooves 7 and 9 and the rails are adjusted with respect to said balls so that there is an exact metal-to-metal contact between the balls and the rails and no measurable clearance exists therebetween. Since it will be evident that the difference between the position of the rails which will unduly bind the balls and the position in which the balls are excessively loose is only a matter of a few ten-thousandths of an inch, it will be apparent that this adjustment is necessarily a very precise adjustment.

As thus far described, the apparatus has been known for many years and is the apparatus giving rise to the above-discussed problem.

Turning now to the improvement in said apparatus which is the subject matter of the present invention, there is provided a rack 16 affixed by a series of screws at which one appears at 17 to the table and located directly over the vertical diameters of said balls. A similar rack 19 is fastened by any suitable means, such as screws of which one appears at 21, onto the base structure in a position directly below the vertical diameters of said balls. A pinion 23 is located at one end of the row of balls and is in mesh with the upper and lower racks. The pinion may be provided with a suitable hub such as a ball 12a (FIGURE 5) for the purpose of preventing sideward movement of the pinion with respect to said rails or preferably (FIGURE 5), it may itself be of width only slightly less than the space between said rails whereby it is closely confined therebetween, and in such case it is supported with respect to the rails on and by a ball 12a running in the same grooves as the others of the balls 12.

A buffering or limiting device 24 is located between the pinion 23 and the nearest adjacent ball 26 for preventing the pinion from battering itself on said adjacent ball. Said buffering or limiting device is preferably of generally cylindrical shape for snug but readily slidable reception into the opposed grooves of a given pair of rails, has a slot 27 at one end thereof for reception of a portion of the pinion and is substantially flat on its other end 28 which contacts said ball 26.

A stop member 29 is normally placed at the end of one of said pair of rails for closing the groove and thereby positively preventing improper overrunning of the table with respect to the base.

A similar pinion 30 is placed at the other end of said roller balls and is similarly provided with a buffering or limiting device 31 and an end stop 32. Since the pinion 30, the buffering or limiting device 31 and the end stop 32 are all identical to the pinion 23, buffering or limiting device 24 and the end stop 29 already described, no detailed description of these further parts is needed.

A dust shield 33 may, if desired, be affixed to one of the rails and overlie the other thereof for obstructing the entry of dust, dirt and other materials, such as grinding dust where the table is used for a grinder, from moving downwardly and into said balls and grooves.

*Operation*

While the operation of the apparatus has probably been sufficiently indicated above, it will be reviewed in the interest of insuring a complete understanding of the invention.

With movement of the table with respect to the base in a direction permitted by the ballways, both the balls and the pinions will rotate in the same direction and at the same rate of rotation. However, the pinions will rotate in a positive manner and will move through a positively determinable distance. Thus, regardless of the position of the table, the distance between the opposed faces 28 and 34 of the two buffering devices 24 and 31, respectively, will always remain equal. Thus, the balls are held positively at all times between the two planes defined by faces 28 and 34 of the buffering devices and any tendency for any of the balls to move through a different distance will be immediately corrected.

Thus, the table can reciprocate freely and unlimitedly with respect to the base structure and the balls will always remain in exactly the same position with respect to the table and base structure and there will be no tendency for the balls to creep in one direction or the other. There being no tendency for the balls to creep in one direction or the other, there is no chance for them to accumulate error and eventually bind against one end or the other of the rail grooves. Therefore, the sliding of the balls on the rails and the resulting scratching and gouging of the rails by the balls is eliminated and the several objects and purposes of the invention above described are obtained.

Although particular preferred embodiments of the invention have been disclosed above for illustrative purposes, it will be understood that variations or modifications of such disclosure which lie within the scope of the appended claims are fully contemplated.

What is claimed is:

1. In combination with a base and a member, structure for supporting the member reciprocably with respect to the base comprising: a pair of guideways positioned respectively on said member and on said base; a row of balls arranged between said guideways with adjacent balls being substantially in abutting relationship, said balls supporting one of said guideways on and reciprocably with respect to the other; independent limit means located at each end of said row of balls; separate drive means movable in response to the movement of said member with respect to said base for effecting simultaneous but independent movement of said limit means at the same rate of speed, said limit means being arranged for maintaining a predetermined distance therebetween and for thereby holding said balls within a zone of predetermined length whereby said balls will move together and simultaneously in response to movement of said guideways.

2. In combination with a base and a table, structure for supporting the table reciprocably with respect to the base comprising: a pair of guideways, one thereof being connected to said table and the other thereof being connected to said base, said guideways being arranged with respect to each other for the reception of bearing balls between; a row of bearing balls arranged between said guideways for reciprocably supporting one thereof on and with respect to the other, said bearing balls being arranged in end-abutting-end relationship; independent limit means positioned at each end of said row of balls and arranged with respect to said guideways for positive movement in response to relative movement of said guideways, said movement of said limit means being in the same direction and for the same distance as the average corresponding movement of said balls, whereby to effect equal and simultaneous movement of said balls in response to relative movement of said guideways.

3. In combination with a base and a table, structure for supporting the table reciprocably with respect to the base comprising: a pair of guideways, one thereof being connected to said table and the other thereof being connected to said base, said guideways being arranged with respect to each other for the reception of bearing balls therebetween; a row of bearing balls arranged between said guideways, said bearing balls being arranged in end-abutting-end relationship; a pinion arranged at each end of said row of balls; a rack fixed with respect to one guideway and engaging one side of said pinions and a second rack fixed with respect to the other guideway and engaging the opposite side of said pinions, said racks being parallel to the direction of relative movement of said guideways; whereby said pinions will establish a zone for the reception of said balls and will positively effect movement of said balls in response to relative reciprocal movement of said guideways.

4. A device as defined in claim 3 wherein said guideways are spaced from each other and said racks are respectively mounted on said table and said base adjacent to said guideways and facing the space therebetween, said pinions extending through said space and meshing with said racks.

5. A device as defined in claim 4 wherein said guideways are horizontally spaced with respect to each other and wherein said pinions are arranged with radii defining a vertical plane.

6. A bearing structure for supporting a pair of members for relative reciprocation comprising: a pair of spaced, opposed guideways defining an unobstructed, elongated zone in which bearing balls may be received; a set of bearing balls arranged in a row and disposed in said zone; limit means at the ends of said zone engageable with the balls at the ends of said row; the distance between said limit means being not substantially greater than the combined diameters of said balls so that said balls are movable into contact with adjacent balls and are free to roll along said guideways; and means for effecting simultaneous and equal movement of said limit means in the same direction in response to relative reciprocation of said members.

7. A bearing structure according to claim 6 wherein said guideways are defined by members having opposed, partially circular recesses in which said balls are received, said recesses having continuous, unbroken walls from one end thereof to the other.

8. A bearing structure for supporting a pair of members for relative reciprocation comprising: a pair of spaced, opposed guideways defining an elongated zone in which bearing balls may be received; a set of bearing balls disposed in said zone in substantially abutting relationship, the set of balls extending from one end of the zone to the other, said balls being free to roll along said guideways; movable limit means at the ends of said zone engageable with the balls at the ends of said set; elongated drive means fixed with respect to said guideways and located on opposite sides of said zone and drivingly engaged with said limit means for effecting simultaneous and equal movement of said limit means in the same direction, said drive means extending beyond said limit means and being longer than said distance between said limit means by an amount at least equal to the distance said balls can roll in said guideways whereby said balls are at all times disposed between said drive means.

9. In combination with a base and a member, structure for supporting said member for reciprocable movement with respect to said base comprising: a pair of elongated, spaced guideways secured to said base and said member, respectively, said guideways having opposed, elongated, partially circular recesses therein defining an unobstructed, elongated zone; a set of bearing balls arranged in a row and disposed in said zone for rolling movement therealong, the remainder of said zone being unobstructed so that said balls may contact each other; a pair of independent buffering devices disposed in said zone adjacent the end balls of said row; a pair of pinions movable longitudinally within said zone and being engageable with said buffering devices for effecting longitudinal movement thereof along said zone; a pair of elongated racks secured to said base and to said member, respectively, said racks extending substantially the full length of said guideways, said racks each being meshed with said pinions through the spaces between said guideways whereby reciprocation of said member with respect to said base will effect simultaneous movement of said pinions at the same speed and in the same direction and thereby effect corresponding movement of said balls, said balls at all times being located within said zone and between said racks.

10. In combination with a base and a table structure for supporting the table reciprocably with respect to the base, comprising: a pair of guideways, one thereof being connected to said table and the other thereof being connected to said base, said guideways being arranged with respect to each other for the reception of bearing balls therebetween; a row of bearing balls arranged between said guideways; a pinion arranged at each end of said row of balls; a pair of slides interposed respectively between each of said pinions and the ball adjacent thereto, said slides having at least a portion of substantially cylindrical shape and said cylindrical portion of a diameter substantially equal to the diameter of said balls, said slides being received within the space between said guideways and constituting means for separating said balls from direct engagement by said pinions; a rack fixed with respect to one guideway and engaging one side of said pinions and a second rack fixed with respect to the other guideway and engaging the opposite side of said pinions, said racks being parallel to the direction of relative movement of said guideways; whereby said pinions will establish a zone for the reception of said balls and will positively effect movement of said balls in response to relative reciprocable movement of said guideways.

References Cited in the file of this patent

UNITED STATES PATENTS

| | | |
|---|---|---|
| 2,863,705 | Gluchowicz | Dec. 9, 1958 |
| 2,866,505 | Forkner | Dec. 30, 1958 |
| 2,887,344 | Hause | May 19, 1959 |
| 2,951,728 | Drake | Sept. 6, 1960 |